United States Patent
Hamon et al.

(10) Patent No.: US 7,238,641 B2
(45) Date of Patent: Jul. 3, 2007

(54) CATALYST BASED ON FERRIERITE/IRON FOR CATALYTIC REDUCTION OF NITROUS OXIDE

(75) Inventors: Christian Hamon, Saint-Nazaire (FR); Karine Malefant, Queven (FR); Bernard Neveu, deceased, late of Puteaux (FR); by Geneviève Neveu, legal representative, Puteaux (FR)

(73) Assignees: Grande-Paroisse S.A. (FR); Institut Regional des Matariaux Avances (IRMS) (FR)

( * ) Notice: Subject to any disclaimer, the term of this patent is extended or adjusted under 35 U.S.C. 154(b) by 339 days.

(21) Appl. No.: 10/724,173

(22) Filed: Dec. 1, 2003

(65) Prior Publication Data

US 2004/0192538 A1  Sep. 30, 2004

Related U.S. Application Data

(62) Division of application No. 09/582,622, filed as application No. PCT/FR98/02747 on Dec. 16, 1998, now Pat. No. 6,682,710.

(30) Foreign Application Priority Data

Dec. 31, 1997  (FR)  .................................. 97 16803

(51) Int. Cl.
*B01J 23/58* (2006.01)
(52) U.S. Cl. ....................................... 502/330; 502/338
(58) Field of Classification Search ............. 423/594.1, 423/632, 633, 634, 700, 712, DIG. 23; 502/74, 502/338, 330
See application file for complete search history.

(56) References Cited

U.S. PATENT DOCUMENTS

| | | | |
|---|---|---|---|
| 3,899,441 A | 8/1975 | Hansford | |
| 4,002,575 A | 1/1977 | Ward | |
| 4,251,499 A | 2/1981 | Nanne et al. | |
| 5,270,024 A | 12/1993 | Kasahara et al. | |
| 5,516,497 A * | 5/1996 | Speronello et al. | ......... 423/235 |
| 5,589,147 A * | 12/1996 | Farnos et al. | ............ 423/239.2 |
| 6,682,710 B1 | 1/2004 | Hamon et al. | |

FOREIGN PATENT DOCUMENTS

| | | |
|---|---|---|
| DE | 4 413 404 | 10/1995 |
| EP | 0 012 473 | 6/1980 |
| EP | 0 625 369 A1 | 11/1994 |
| WO | WO 94/27709 | 12/1995 |
| WO | WO 99/34901 | 7/1999 |

OTHER PUBLICATIONS

F. Kapteijn, Heterogeneous catalytic decomposition of nitrous oxide, Applied Catalysis B: Environmental 9 (1996), pp. 25-64, no month.

D. Breck, Zeolite Molecular Sieves, Structure, Chemistry, and Use, Table 4.45 Synthetic Ferrierite-Type Zeolite (39), p. 358, no date.

Database WPI, Section Ch, Week 9735, Derwent Publication Ltd., London, GB; AN 97-383857, XP 002077714 (RU 2 071 817 C (As Sibe Catalysis Inst), Jan. 20, 1997).

* cited by examiner

*Primary Examiner*—Edward M. Johnson
(74) *Attorney, Agent, or Firm*—Hunton & Williams LLP

(57) ABSTRACT

A catalyst for reducing the nitrous oxide content in gas, which operates at relatively low temperatures, the activity of which is relatively insensitive to the presence of water vapor and which is highly resistant to hydrothermal degradation, is prepared from ferrierite exchanged with iron. Application to the treatment of gases with a low $N_2O$ content, such as gases resulting from plants for the manufacture of nitric acid, and of gases with a high $N_2O$ content, which are emitted during oxidations of organic compounds by nitric acid.

19 Claims, No Drawings

CATALYST BASED ON FERRIERITE/IRON FOR CATALYTIC REDUCTION OF NITROUS OXIDE

CROSS-REFERENCED AND RELATED APPLICATIONS

This application is a divisional of U.S. application Ser. No. 09/582,622 which was filed on Mar. 5, 2001, now U.S. Pat. No. 6,682,710, which was a 371 of PCT/FR98/02747 filed Dec. 16, 1998 which claimed priority to FR97/16803 filed on Dec. 31, 1997 which are hereby incorporated by reference in their entirety.

BACKGROUND OF THE INVENTION (i) Field of the Invention

The invention comes within the general scope of the reduction of the content of greenhouse gases in gaseous effluents of industrial origin discharged to the atmosphere. It is a question here of lowering nitrous oxide $N_2O$ in gaseous discharges.

For a long time, concern was only felt about the discharge of nitric oxides (NOx), which easily combine with water to form nitrous or nitric acids, the most spectacular sign of which is without doubt acid rain, with subsequent destruction of forests and damage to exposed monuments, and the most insidious signs of which are contamination of breathable air and its effect on public health. Awareness has now arisen of the significant contribution of nitrous oxide to enhancing the greenhouse effect, with the risk of leading to climatic changes with uncontrolled effects, and perhaps also of its participation in the destruction of the ozone layer. Its removal has thus become a preoccupation of the authorities and of manufacturers.

While the most significant sources of $N_2O$ are the oceans, uncultivated soils, agriculture, the combustion of organic matter and the use of fossil fuels, the chemical industry contributes some 5 to 10% of emissions of this gas. Nitric acid plants, as well as plants for organic synthesis employing nitric oxidation processes (production of adipic acid, of glyoxal, and the like), are the source of most discharges of $N_2O$ by the chemical industry (see, in this respect, Freek Kapteijn et al., Heterogenous Catalytic Decomposition of Nitrous Oxide, in Applied Catalysis B, Environmental 9, 1996, 25-64).

For some years already, most nitric acid plants have been equipped with so-called DeNO$_x$ reactors, which operate satisfactorily in removing nitric oxides from their effluents. However, $N_2O$ which is essentially produced during the oxidation of ammonia over the platinum gauzes of the burners, remains substantially constant between the outlet of the burners and the inlet of the DeNO$_x$ reactor and is not lowered by passage of the gases through this reactor (sometimes, it is even slightly increased).

Provision has been made to reduce the $N_2O$ content of the gaseous effluents resulting from nitric oxidation processes in organic chemistry by catalytically destroying the nitrous oxide contained in the latter over a mordenite/iron catalyst (EP 0,625,369). However, on account of the large fall in its activity in the presence of steam in the temperature range 350-450° C., this catalyst is not well suited to functioning with respect to dilute gases and ages badly, due to a mediocre hydrothermal resistance.

It also turns out to be economically unsuited to the treatment of the tail gases from nitric acid plants, which, upstream of the expansion turbine, generally correspond to the following characteristics, temperature: <400° C.
$N_2O$ content: between 500 and 1500 ppmv,
NO$_x$ content: between 50 and 2000 ppmv,
$H_2O$ content: between 0.5 and 5%.

The economic optimization of the lowering of $N_2O$ both in the gases emitted by organic plants and by nitric acid plants involves the development of a catalyst which retains a good activity for the destruction of $N_2O$ at a temperature below 400° C. in the presence of NOx and of steam, and which has a sufficient hydrothermal stability at 600° C. to withstand the temperature peaks to which it may be subjected under certain circumstances in its use.

(ii) Description of Related Art

A solution corresponding to such specifications has just been found with a catalyst, composed of agglomerates formed of 80 to 90% of a ferrierite/iron assaying from 1 to 6% of iron, and preferably from 2 to 4%, and of 20 to 10% by weight of an agglomeration binder (percentages by weight with respect to the weight of the granule).

SUMMARY OF THE INVENTION

The ferrierite/iron is the active component of the catalyst according to the invention. The structure of its crystal lattice is that of ferrierite [RN=12173-30-7], that is to say a zeolite traversed by two systems of channels, one parallel to the c axis of the structure, formed of channels with an elliptical cross-section (0.43 nm×0.55 nm) of approximately 0.18 nm$^2$ (18 Å$^2$), the other parallel to the b axis and the c axis of the structure, with channels formed of 8-membered rings, with 0.34×0.48 nm axes. There is no channel parallel to the a axis. Approximately spherical cavities, with an approximate diameter of 0.7 nm, lie on these channels and are accessible only through the 8-membered rings, i.e. via 0.43 nm×0.55 nm or 0.34 nm×0.48 nm pores. The ferrieritic structure is completely characterized by its X-ray diffraction diagram (for the interlattice distances, consult Breck "The Synthetic Zeolites", 1974 Edition, Table 4.45, p. 358).

This ferrierite/iron is obtained by subjecting a commercial ferrierite, of sodium/potassium type, to exchange with an aqueous solution of an iron salt, so as to obtain the desired iron content. The operating procedures are well known to a person skilled in the art. It is possible, in particular, to carry out one or more exchanges by immersion in an iron salt solution or by column percolation, either of the ferrierite powder itself or with respect to granules.

This exchange can be carried out either using a ferric salt solution or using a ferrous salt solution. Use is advantageously made of ferrous sulphate, which is a very low cost product and which does not introduce chlorides, which are sources of corrosion, into the preparation.

Preference is given to the form exchanged with iron starting from the ammonium form of ferrierite, which is obtained by subjecting a commercial ferrierite, the electrical neutrality of the crystallographic lattice of which is essentially produced by sodium and potassium alkali metal ions, to an exchange with a solution of an ammonium salt. The ferrierite/iron obtained from the ammonium form of ferrierite exhibits, as characteristic, that of having a very low content of alkali metal ions in the exchange position. It is the low content of potassium ions (less than 0.5% by weight) which analytically indicates this preferred form of the catalyst of the invention. The ferrierites/iron according to the invention contain only 0.5 to 0.1% of potassium.

The catalysts according to the invention are shaped as agglomerates, a presentation which is necessary for reasons of minimization of the pressure drop as they pass through the catalyst bed. The agglomeration of zeolites is well known to a person skilled in the art. It is carried out by forming a paste of the zeolite powder with a binder, generally fluidified with water, often composed of a clay which is simultaneously sufficiently plastic to be able to form the agglomerate as balls, using a dish granulator, as pellets by molding or as extrudates, using an extruder, and hardenable by calcination to give sufficient cohesion and hardness to the agglomerate. The clays used are kaolinites, attapulgites, bentonites, halloysite or mixtures of these clays.

It is also possible to use siliceous or aluminous binders. In particular, agglomeration with peptized aluminas gives very strong granules, this method of agglomeration being possible here because ferrierite is not degraded by the acidity of the binder.

After agglomeration, the granules are thermally activated. This means that they are subjected to a calcination carried out under air at a temperature of approximately 400° C., the role of which is both to harden the binder, to dehydrate it without hydrothermally degrading it and, in the case of ferrierites exchanged starting from an ammonium form, to remove a large part of the ammonium ions and to bring the zeolite to the H form.

It is also possible to start by agglomerating the sodium/potassium ferrierite, then to harden it by calcination and to carry out exchanges on the agglomerate. After drying, a second calcination makes it possible to bring the ferrierite/iron to the H form, if the ferrierite employed was taken in the ammonium form.

This catalyst is the improved catalytic means of a process for destroying $N_2O$, contained in a gas mixture, according to the overall reaction:

$$2N_2O \rightarrow 4\ 2N_2 + O_2$$

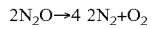

This process, which is also one of the subjects of the present invention, consists in passing the gases to be purified, in which the range of concentrations of $N_2O$ extends from 500 ppm to 50%, of $H_2O$ from 0.5 to 5% and of NO from 50 to 2000 ppm, through a catalyst bed placed in an axial or radial flow reactor maintained at a temperature of between 350 and 600° C. In the treatment of a gas with a high $N_2O$ content and with an initial temperature of less than 350° C., as is generally the case in processes for organic synthesis by nitric oxidation, the initiation of the reaction can be facilitated by preheating, during the start-up phase, the gas flow or the catalyst by an external means, the temperature of the catalytic bed subsequently being self-supporting because of the exothermicity of the reaction. In certain situations, in particular in the case of the treatment of gas with a high $N_2O$ concentration, heat exchangers or devices of quench type can advantageously be immersed in the catalytic bed in order to control the temperature of the latter, it optionally being possible to use part of the heat to preheat the gas to be treated.

Contrary to other zeolitic catalysts, the ferrierite/iron according to the invention retains a manifest activity with respect to $N_2O$ in the presence of water. This activity is very much enhanced in the presence of NO, which is a very favorable factor because this synergy becomes more significant for very low levels of NO, of the order of 50 ppm, and because the gases capable of such a treatment almost always contain such traces of NO.

The process according to the invention finds its application in particular in the treatment of tail gases from nitric acid plants, both before and after DeNOx treatment, which gases can have compositions within the following limits, $N_2O$ content: between 500 and 1500 ppmv,
$NO_x$ content: between 50 and 2000 ppmv,
$H_2O$ content: between 0.5 and 3%,
oxygen content: approximately 2%, the remainder being essentially composed of nitrogen.

The process can also be applied to the treatment of gases resulting from plants for organic oxidation using nitric acid in organic chemistry, in particular in the manufacture of adipic acid, of glyoxal and of glyoxylic acid. These are gases with the approximate composition, before optional dilution with air, as follows:

$N_2O$ content: between 20 and 50%
$NO_x$ content: between 50 and 5000 ppmv,
$H_2O$ content: between 0.5 and 5%,
oxygen content: between 1 and 4%,
$CO_2$ content: approximately 5%, the remainder being essentially composed of nitrogen.

EXAMPLES

In the following examples, which are nonlimiting but intended to give a better understanding of the invention, the same catalytic test procedure has been followed, which procedure comprises the preparation of the sample and the catalytic test proper.

a) Preparation of the Catalyst

The exchanged zeolite powder is dried in an oven at 100° C. and then mixed with a silica sol, containing 40% by weight of $SiO_2$, in an amount such that the silica $SiO_2$ content with respect to the $SiO_2$+zeolite dry combination is 10%. The paste obtained is dried at 100° C. for 6 hours and then reduced to a powder in a mortar. The powder is pelletized to pellets with a diameter of 5 mm which are activated in an oven at 400° C. under air for 2 hours. After cooling, the pellets are crushed and sieved at 0.5.-1 mm, this fraction constituting the catalyst.

b) Catalytic Test

It is carried out in a traversable stationary bed test unit (catatest) surrounded by heating shells regulated by PID, which brings the catalytic bed to a temperature approximately 25° C. below their set-point temperature. The reactor has a diameter of 15 mm. The catalyst volume employed is 10 cm³, i.e. a bed with a height of 57 mm.

The reaction gas is prepared from compressed air, from nitrogen and from standard gas, 2% $N_2O$ in $N_2$, 2% NO in $N_2$. The water vapor content is adjusted by an air humidifier, according to the laws of vapor pressure.

$N_2O$ analyses are carried out by infrared and NOx analyses by chemiluminescence.

The results are expressed as degrees of conversion of $N_2O$ to $N_2$.

Example 1

Preparation of Various Ferrierite/Iron Compositions

The ferrierite is supplied by Tosoh. Its Si/Al ratio is 8.85 and its Na and K contents, on a dry basis, after calcination at 1000° C. are 0.92% and 4.7% respectively. Taking into account its loss on ignition of 25% at 1000° C., its formula is

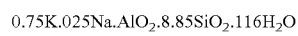

$0.75K.025Na.AlO_2.8.85SiO_2.116H_2O$

The direct ferric exchange is carried out as follows. 100 g of zeolite powder are suspended, in a 1 liter round-bottomed glass flask, with 0.5 l of molar aqueous ferric chloride ($FeCl_3$) solution (i.e. 8.1 g of $FeCl_3$ per liter), namely with a volume of liquid/weight of dry solid ratio of 5. The system is kept stirred at 60° C. for 4 hours. The exchanged zeolite is recovered by filtration on a filter funnel, washed by percolation with 2 liters of demineralized water at ambient temperature and then dried on a tray in a ventilated oven overnight.

The iron, potassium and sodium contents with respect to the dry product (1000° C.) are 2.7%, 2.8% and 0.16% respectively. These quantities can be varied by adjusting the temperature, the duration of the exchanges and their number.

| Ref. | T° | Time (h) | $Fe^{3+}$ exchanges | Fe % | Na % | K % |
|---|---|---|---|---|---|---|
| 1.1 | 60 | 4 | 1 | 2.7 | 0.16 | 2.8 |
| 1.2 | 60 | 4 | 1 | 3.8 | 0.1 | 2.7 |
| 1.3 | 80 | 4 | 3 | 7.7 | <0.05 | 0.16 |

These products are subsequently named $FERFe^{3+}$ Na, K form.

The ferric exchange on ferrierite exchanged beforehand with ammonium ions is carried out as follows.

A first exchange is carried out, on 100 g of the same zeolite as above, with 0.5 liter of an 800 g/l ammonium nitrate solution at a temperature of 80° C. for 4 hours. The exchanged product is recovered, washed and dried as above. Its sodium content is less than 0.1% and its potassium content less than 0.15%.

The ferric exchange is subsequently carried out as above but with two successive exchanges. The continuation of the operation is the same as in Example 1. A ferrierite/iron is obtained for which the iron, potassium and sodium contents are 2.2%, 0.15% and less than 0.1% respectively. These quantities can be varied by adjusting the temperature, the duration of the exchanges and their number. The following were thus obtained

| Ref. | T° | Time (h) | Number of $Fe^{3+}$ exchanges | Fe % | Na % | K % |
|---|---|---|---|---|---|---|
| 2.1 | 60 | 5 | 1 | 1.26 | | |
| 2.2 | 60 | 4 | 2 | 2.2 | <0.05 | 0.15 |
| 2.3 | 80 | 4 | 1 | 3.2 | <0.05 | 0.12 |
| 2.4 | 80 | 4 | 2 | 7 | <0.05 | <0.05 |

These products are subsequently named $FERFe^{3+}$, $NH_4$ form.

Example 2

Power of Conversion of $N_2O$ of Ferrierites/Iron$^{3+}$ in Gases with a Low $N_2O$ Content The test is carried out, according to the experimental procedure explained above, on nitrogen enriched with

| $N_2O$ | 1000 ppm |
|---|---|
| $O_2$ | 2% | at an hourly volumetric rate or HVR of 10,000 $h^{-1}$.

In addition, the gas may or may not contain nitrogen oxide NO or water. The specific conditions of the test are as follows 1: 375° C., NO=0, $H_2O$=0
2: 375° C., NO=1000 ppm, $H_2O$=0
3: 375° C., NO=1000 ppm, $H_2O$=3%
4: 400° C., NO=1000 ppm, $H_2O$=3%

The following % conversion results are obtained

Conversion of $N_2O$ to $N_2$, different conditions

| | | | Test conditions | | | |
|---|---|---|---|---|---|---|
| | Ref. | Fe % | 1 | 2 | 3 | 4 |
| Na, K form | 1.1 - | 2.7 | 10% | 50% | 30% | 42% |
| | 1.2 | 3.8 | 14 | 50 | 20 | 45 |
| | 1.3 | 7.7 | 35 | 75 | 34 | 72 |
| H form | 2.1 | 1.26 | 49 | 88 | 44 | 72 |
| | 2.2 | 2.2 | 46 | 97 | 48 | 77 |
| | 2.3 | 3.2 | 24 | 79 | 35 | 66 |
| | 2.4 | 7 | 33 | 84 | 52 | 85 |

An excellent activity of the ferrierite/iron, H form, is observed.

Example 3

Power of Conversion of $N_2O$ of Ferrierites/Iron$^{2+}$ in Gases with a Low $N_2O$ Content The preceding operations are repeated but, instead of ferric chloride, the exchange is carried out with a ferrous salt, ferrous sulphate $FeSO_4$ $7H_2O$. The procedures are carried out equally in Na, K form and in $NH_4$ form. The products of the $FERFe^{2+}$, Na, K form, series:

| Ref. | T° | Time (h) | Number of $Fe^{3+}$ exchanges | Fe % | Na % | K % |
|---|---|---|---|---|---|---|
| 3.1.1 | 80 | 4 | 1 | 1.8 | 0.25 | 3.2 |
| 3.1.2 | 80 | 4 | 3 | 4.1 | 0.2 | 1.8 | and the products of the $FERFe^{2+}$, $NH_4$ form, series:

| Ref. | T° | Time (h) | Number of $Fe^{3+}$ exchanges | Fe % | Na % | K % |
|---|---|---|---|---|---|---|
| 3.2.1 | 80 | 4 | 1 | 1.7 | <0.05 | 0.15 |
| 3.2.2 | 80 | 4 | 3 | 5.46 | <0.05 | 0.15 | are thus obtained.

The results of the catalytic test are as follows, the conditions being those in the preceding example:

Conversion of $N_2O$ to $N_2$

|  | Ref. | Fe % | 1 | 2 | 3 | 4 |
|---|---|---|---|---|---|---|
| Na, K form | 3.1.1 | 1.8 | 12% | 90% | 22% | 43% |
| H form | 3.2.1 | 1.7 | 31 | 93 | 48 | 78 |
|  | 3.2.2 | 5.46 | 29 | 98 | 50 | 78 |

An excellent activity of the ferrierite/iron, form H, is observed. There is no substantial difference between the ferric and ferrous series.

Example 4

Conversion of $N_2O$—Comparison of Various Zeolites/Iron

Various zeolites/iron, all exchanged in their $NH_4$ form starting from ferrous sulphate, are now compared with a ferrierite/iron$^{2+}$, at iron assays in the region of 2%. The zeolite Y is a Y with an Si/Al ratio of 20 and assays, after exchange, 1.8% of iron and <0.1% of sodium; the pentasil has an Si/Al of 13.5 and assays, after exchange, 1.6% of iron and <0.05% of sodium; the beta has an Si/Al of 12.5 and assays, after exchange, 1.9% of iron and <0.05% of sodium; the mordenite has an Si/Al of 5.5 and assays, after exchange, 1.9% of iron and <0.05% of sodium. The ferrierite is the ferrierite with the reference 2.2 in Example 2.

Conversion of $N_2O$

| Zeolite | Iron % | 1 | 2 | 3 | 4 |
|---|---|---|---|---|---|
| Y | 1.8 | 28 | 45 | 22 | 38 |
| Pentasil | 1.6 | 7 | 62 | 14 | 30 |
| Beta | 1.9 | 47 | 98 | 21 | 44 |
| Mordenite | 2.4 | 8 | 91 | 22 | 42 |
| Ferrierite | 2.2 | 46 | 97 | 48 | 77 |

It is found that only the ferrierite retains a significant activity in conversion of $N_2O$ in the presence of water vapor.

Example 5

Comparative Activities of a Mordenite/Iron and of a Ferrierite/iron in Gases with a High $N_2O$ Content The reduction in the $N_2O$ content obtained with the preceding mordenite/iron containing 2.4% of iron is compared with that of two ferrierites, one containing 1.46% of iron and the other containing 3.37% of iron.

The conditions of the test are

| $N_2O$ | 5% |
|---|---|
| $O_2$ | 5% |
| HVR | 10,000 h$^{-1}$ |
| 5: | 325° C., NO = 0 |
| 6: | 325° C., NO = 1000 ppm |
| 7: | 375° C., NO = 0 |
| 8: | 375° C., NO = 1000 ppm |
| 9: | 425° C., NO = 0 |
| 10: | 425° C., NO = 1000 ppm |
| 11: | 475° C., NO = 0 |
| 12: | 475° C., NO = 1000 ppm |

The degrees of decomposition below are recorded.

Conversion of $N_2O$ to $N_2$

|  | Fe % | 5 | 6 | 7 | 8 | 9 | 10 | 11 | 12 |
|---|---|---|---|---|---|---|---|---|---|
| Mordenite/iron | 2.4 | 0.1 | 0 | 0.8 | 14.3 | 6.8 | 21.6 | 35.2 | 65.8 |
| Ferrierite/iron | 1.46 | 1.6 | 1.2 | 5.3 | 11.6 | 12.3 | 36.7 | 42.1 | 8.7 |
| Ferrierite/iron | 3.37 | 0.8 | 3.2 | 1.1 | 13.2 | 5 | 93.4 | 49.3 | 99.9 |

These results exhibit a higher level of conversion of $N_2O$ with the ferrierite.

Example 6

Aging

The result of a comparative hydrothermal stability test between a mordenite/iron with an Si/Al ratio of 5.5, H form, exchanged with iron to the level of 2.4% by weight, and a ferrierite/iron according to the invention, an H form, exchanged with iron to the level of 2.2% (reference 2.2 in Example 1), is reported here.

The aging was carried out by exposure of the catalysts to an air/water vapor mixture in a dried bed at 650° C. for 3 hours. The air is saturated with water vapor at 90° C.

The two catalysts are, tested as above with respect to conversion of $N_2O$, the operating conditions being

| $N_2O$ | 1000 ppm |
|---|---|
| NO | 1000 ppm |
| $O_2$ | 10% |
| Temperature: | 375° C. |
| HVR | 10,000 h$^{-1}$ |
| 13: $H_2O$ = 0 | |
| 14: $H_2O$ = 3% | |

The following results are obtained:

Conversion of $N_2O$ to $N_2$

|  |  | 13 | 14 |
|---|---|---|---|
| Mordenite | Before aging | 91 | 22 |
| Mordenite | After aging | 32 | 10 |
| Ferrierite | Before aging | 88 | 40 |
| Ferrierite | After aging | 83 | 39 | which results confirm the remarkable stability of the ferrierite/iron to water vapor.

Example 7

Granules with an Aluminous Binder

In a first step, extrudates containing 20% of aluminous binder are formed as follows. An alumina of NG type, supplied by the company Condea, is used for the manufacture of the agglomerated catalyst. In a first step, it is peptized by continuously introducing, into a mixer, alumina at the rate of 15 kg/h and 5% by weight nitric acid with a flow rate of 0.16 l/min. 5 kg of the peptized alumina gel thus obtained are mixed with 10 kg of ferrierite powder, in the, Na, K form, as supplied by Tosoh (see Example 1), in a conventional powder mixer. The resulting mixture is fed to a mixer/extruder at the same time as 3 liters of water. The extruder is a device of Redco type from the company Aoustin, with a diameter of 5 cm, equipped at the outlet with a die forming extrudates with a diameter of 3.8 mm which are cut into elements with a length of 5 to 10 mm. The extrudates are subsequently transferred, with a thickness of approximately 15 mm, to a muffle furnace, through which air passes, at 100° C. for 4 hours and then at 450° C. for 3 hours, in order to confer a satisfactory mechanical strength on them.

200 g of these ferrierite extrudates are now introduced into a stainless steel basket in order to steep them in 1 liter of an 800 g/l ammonium nitrate solution at a temperature of 80° C. for 3 hours, then to wash them by successive steepings (3) in 1 liter of demineralized water, and then to dry them at 100° C.

Their sodium and potassium content on a dry basis (1000° C.) is 0.1% (Na) and 0.15% (K).

Exchange with iron is then carried out according to the same principle with 1 liter of iron ($Fe^{2+}$) sulphate solution containing 280 g/l of $FeSO_4$ $7H_2O$ at 80° C. for 3 hours, followed by washing by successive steepings in 1 liter of demineralized water and by drying. The iron content on a dry basis (1000° C.) is 1.6%.

The catalyst thus prepared is subjected to the catalytic test described above in a reactor with a diameter of 25 mm. The catalyst volume is 25 $cm^3$, i.e. a height of approximately 5 cm. The catalytic test is applied under the conditions 1 to 4 of Example 2.

The following are obtained:

| | Conversion of $N_2O$ to $N_2$ | | | |
|---|---|---|---|---|
| | Test Conditions | | | |
| Catalyst | 1 | 2 | 3 | 4 |
| Aluminous granules | 30% | 89% | 43% | 72% | which are results highly comparable with those of Example 2.1.

The invention claimed is:

1. A catalyst for conversion of $N_2O$ comprising a ferrierite/iron assaying from 1 to 6% of iron by weight in ion exchange position and 0.1 to 0.5% of potassium by weight in ion exchange position.

2. The catalyst according to claim 1 comprising an agglomerate of 80 to 90% of ferrierite/iron according to claim 1, and 20 to 10% of an agglomeration binder.

3. The catalyst of claim 2, wherein the agglomeration binder is a clayey, siliceous or aluminous agglomeration binder.

4. A process for the preparation of the catalyst of claim 2, comprising the steps of:
    agglomerating a ferrierite powder with a binder to form an agglomerate paste,
    shaping the paste as extrudates, in a proportion of 80 to 90% of ferrierite and 20 to 10% of binder, as weight % on a dry basis,
    heating the agglomerate at a temperature sufficient for calcination,
    carrying out at least one exchange with an aqueous iron salt solution, so that the exchanged ferrierite assays from 1 to 6% of iron by weight,
    dying the exchanged agglomerate.

5. A process for the preparation of a catalyst of claim 2, comprising the steps of:
    exchanging a ferrierite powder, at least once, with an aqueous iron salt solution, so that the exchanged ferrierite assays from 1 to 6% of iron(percentages by weight),
    agglomerating the exchanged ferrierite powder with a binder to form an agglomerate paste,
    shaping the paste as extrudates, in the proportion of 80 to 90% of ferrierite and 20 to 10% of binder, as weight % on a dry basis,
    heating the exchanged agglomerate at a temperature sufficient for drying and optionally calcining said agglomerate.

6. The process according to claims 4 or 5, wherein the agglomeration binder is a peptized alumina.

7. The process according to claims 4 or 5, wherein the iron salt is a ferrous salt.

8. The process according to claims 4 or 5, wherein the iron salt is a ferric salt.

9. The process according to claim 5, further comprising before agglomerating, the step of subjecting the ferrierite powder beforehand to one or more exchanges with an aqueous solution of an ammonium salt.

10. The process according to claim 4, further comprising, before being exchanged with an iron salt solution, the step of subjecting the agglomerates to one or more exchanges with an aqueous solution of an ammonium salt.

11. The catalyst according to claim 1, wherein said ferrierite/iron comprises from 2 to 4% by weight iron.

12. The catalyst according to claim 2, wherein said agglomeration binder is clayey, siliceous, or aluminous.

13. The process according to claim 4, wherein said binder is a clayey, siliceous or aluminous binder.

14. The process according to claim 4, wherein said temperature sufficient for calcination is approximately 400° C.

15. The process according to claim 4, wherein the exchanged ferrierite assays from 2 to 4% of iron.

16. The process according to claim 5, wherein the exchanged ferrierite assays from 2 to 4% of iron.

17. The process according to claim 5, wherein said binder is a clayey, siliceous or aluminous binder.

18. The process according to claim 5, wherein said temperature sufficient for drying and optionally calcining said agglomerate is approximately 400° C.

19. The process according to claim 13 or 17, wherein the agglomeration binder is a clay, taken alone or as a mixture with kaolinite, attapulgite, bentonite or halloysite.

* * * * *